(12) United States Patent
Kuchman

(10) Patent No.: US 7,417,941 B2
(45) Date of Patent: Aug. 26, 2008

(54) OPTICAL DISC AND METHOD OF PROTECTING SAME

(75) Inventor: Todd J. Kuchman, Highlands Ranch, CO (US)

(73) Assignee: Scratch-Less Disc Industries, LLC, Highlands Ranch, CO (US)

( * ) Notice: Subject to any disclaimer, the term of this patent is extended or adjusted under 35 U.S.C. 154(b) by 440 days.

(21) Appl. No.: 11/031,975

(22) Filed: Jan. 7, 2005

(65) Prior Publication Data

US 2005/0243704 A1 Nov. 3, 2005

Related U.S. Application Data

(63) Continuation of application No. 10/401,868, filed on Mar. 31, 2003, now Pat. No. 6,842,409, which is a continuation-in-part of application No. 09/964,711, filed on Sep. 27, 2001, now Pat. No. 6,680,898.

(60) Provisional application No. 60/270,434, filed on Feb. 21, 2001.

(51) Int. Cl.
  *G11B 7/24* (2006.01)
  *G11B 5/09* (2006.01)
(52) U.S. Cl. .............. 369/275.1; 369/47.1; 369/53.41
(58) Field of Classification Search ............... None
  See application file for complete search history.

(56) References Cited

U.S. PATENT DOCUMENTS

| | | |
|---|---|---|
| 2,631,859 A | 3/1953 | Ellsworth |
| 3,787,274 A | 1/1974 | Genma ........................ 428/64.2 |
| 3,931,457 A | 1/1976 | Mes ............................. 386/95 |
| 3,931,459 A | 1/1976 | Korpel ................... 369/109.01 |
| 4,038,524 A | 7/1977 | Puech et al. .......... 235/61.12 N |
| 4,074,282 A | 2/1978 | Balas, Jr. et al. ............. 346/135 |
| 4,111,698 A | 9/1978 | Sato ............................... 96/79 |
| 4,113,492 A | 9/1978 | Sato et al. ...................... 96/67 |

(Continued)

FOREIGN PATENT DOCUMENTS

DE  28 39 359  3/1980

(Continued)

*Primary Examiner*—Muhammad N. Edun
(74) *Attorney, Agent, or Firm*—Pillsbury Winthrop Shaw Pittman, LLP

(57) ABSTRACT

An optical disc for storage and retrieval of digital data, and a system and method for protecting the optical disc is disclosed. The optical disc has projections or embossments on one or both major surfaces. When the optical disc is placed on a substantially flat surface such as a tabletop or a desktop, the projections act as pedestals that elevate the optical disc above the flat surface. The resulting gap or clearance helps prevent damage to the optical disc caused by contaminants on the flat surface or by defects in the flat surface. The projections are sized to provide adequate clearance between the disc and the flat surface, while minimizing interference between the projections and components of optical disc readers and drives. One or more projections or projection types may also be configured with a flat surface at a point of contact to an external surface to enhance weight distribution, for example. The projections or projection types that may be configured to enhance aerodynamics. The optical disc may also include one or more depressions that are sized and configured to receive projections from another disc, which facilitates stacking of the optical discs.

12 Claims, 9 Drawing Sheets

U.S. PATENT DOCUMENTS

| | | | |
|---|---|---|---|
| 4,175,145 A | 11/1979 | Fechter | 427/240 |
| 4,204,686 A | 5/1980 | Church | 369/291 |
| 4,326,282 A | 4/1982 | Verboom et al. | 369/47.28 |
| 4,336,545 A | 6/1982 | Howe et al. | 346/135.1 |
| 4,353,767 A | 10/1982 | Wilkinson | 156/245 |
| 4,371,954 A | 2/1983 | Cornet | 365/126 |
| 4,462,036 A | 7/1984 | Leonard et al. | 346/137 |
| 4,519,064 A | 5/1985 | Takagi et al. | 369/275.3 |
| 4,536,869 A | 8/1985 | Chandler et al. | 369/287 |
| 4,546,464 A | 10/1985 | Inoue et al. | 369/280 |
| 4,633,458 A | 12/1986 | Tiefensee | 369/275 |
| 4,719,137 A | 1/1988 | Ohta et al. | 428/67 |
| 4,737,408 A | 4/1988 | Kuwahara et al. | 428/335 |
| 4,808,456 A | 2/1989 | Yamada et al. | 428/65 |
| 4,811,326 A | 3/1989 | Gerber | 369/100 |
| 4,891,798 A | 1/1990 | Shinkai | 369/45 |
| 4,961,077 A | 10/1990 | Wilson et al. | 347/262 |
| 5,128,922 A | 7/1992 | Inui et al. | 369/280 |
| 5,247,495 A | 9/1993 | Birukawa et al. | 369/13.35 |
| 5,513,169 A | 4/1996 | Fite et al. | 369/272 |
| 5,987,003 A | 11/1999 | Yokota | 369/280 |
| 6,424,488 B1 | 7/2002 | Misso et al. | 369/98.08 |
| 6,680,898 B2 | 1/2004 | Kuchman | 369/275.4 |
| 6,842,409 B2 * | 1/2005 | Kuchman | 369/47.1 |
| 7,102,985 B2 | 9/2006 | Kuchman | 369/275.1 |
| 7,212,489 B2 | 5/2007 | Kuchman | 369/275.4 |

FOREIGN PATENT DOCUMENTS

| | | |
|---|---|---|
| DE | 31 27 993 | 2/1983 |
| GB | 473988 | 10/1937 |
| GB | 2 004 404 | 3/1979 |
| JP | 58-48089 | 3/1983 |
| JP | 9-320111 | 12/1997 |
| JP | 2001-23238 | 1/2001 |
| KR | 2001-63582 | 7/2001 |

* cited by examiner

OPTICAL DISC AND METHOD OF PROTECTING SAME

CROSS-REFERENCE TO RELATED APPLICATIONS

This application is a continuation of U.S. patent application Ser. No. 10/401,868 filed Mar 31, 2003, now U.S. Pat. No. 6,842,409, which is a continuation-in-part of U.S. patent application Ser. No. 09/964,711 filed Sep. 27, 2001, now U.S. Pat. No. 6,680,898, which claims priority from U.S. Provisional Application No. 60/270,434 filed Feb. 21, 2001. Each of these applications are incorporated herein by reference in their entirety.

BACKGROUND OF THE INVENTION

1. Field of the Invention

The present invention is directed to an optical disc having protective elements and/or surfaces positioned on a recordable surface of the optical disc.

2. Discussion

Optical discs, such as, for example, compact discs (CDs), digital videodiscs (DVDs), and other types of optical disks have become the accepted medium for storing and retrieving large amounts of digital information (data). Standard CDs and DVDs have the same physical dimensions (12 cm OD, 1.2 mm thickness), but differ primarily in the amount of data that each can hold. A standard CD, for example, can store up to about 783 megabytes of audio programming, while DVDs can hold, for example, between about 4.38 gigabytes (single-sided/single-layer DVD) and about 15.9 gigabytes (double-sided/dual-layer DVD) of multimedia programming (photographs, video, audio, etc.). Other optical storage discs include read only memory compact discs (CD-ROMs), recordable compact discs (CD-R), and rewritable compact discs (CD-RW). Though physically similar to audio CDs, CD-ROMs, CD-Rs and CD-RWs can store slightly less data (i.e., less than about 700 megabytes) because a fraction of their respective storage capacities are used by a file system and data associated with enhanced error correction.

Optical discs owe their large storage capacity to the way they represent digital data. With CDs and single-layer DVDs, digitized data, for example binary data, are encoded on the discs as a sequence of microscopic pits separated by smooth areas (lands) that define a continuous track that spirals outward from the center of the disc. Adjacent tracks on CDs may be, for example, 1600 nm apart, and the minimum pit length may be 830 nm, for example. DVD's achieve their greater storage capacity, in part, by shrinking the distance between adjacent tracks (740 nm) and by decreasing the minimum pit length (400-440 nm), for example. Recordable compact discs and rewritable compact discs employ similar data encoding, except that the "pits" on CD-Rs and CD-RWs are replaced by "dark" spots formed, respectively, on a light-sensitive organic dye layer or light-excitable crystal layer.

Optical disc readers (CD or DVD player, CD-ROM, CD-R or CR-RW drives, etc.) retrieve data using a laser pickup assembly and a tracking system. During playback, the laser pickup assembly focuses a laser beam on the spinning optical disc, while the tracking system moves the laser pickup assembly outward from the center of the disc. The optical reader adjusts the angular speed of the disc during data retrieval so that pits and lands of a single track stream past the laser beam at constant linear velocity. The optical pickup includes a detector (e.g., photodiode array) which detects any light reflected by the optical disc. Laser light hitting a land reflects at a higher intensity than laser light hitting a pit (or dark spot), which scatters the light. The optical disc reader translates these temporal changes in detected light intensity into a stream of binary data.

Optical discs have relatively simple, but elegant construction. Digital videodiscs, for example, are composed of one or more layers of plastic (e.g., optical grade polycarbonate) that may be individually formed by injection molding. One surface of each layer may contain the encoded data as a spiral track of microscopic pits and lands, while another surface may be substantially planar. Prior to assembling the layers, DVD manufactures cover the surface containing the pits and lands with a thin metallic layer. The plastic layers that will become the outermost layers of the DVD are coated with semi-reflective gold, while the plastic layers that will become the innermost layers are coated with aluminum. The use of gold allows the laser pickup assembly to focus laser light through the outer layers onto the inner layers of the DVD. Following preparation of the plastic layers, each is coated with acrylic lacquer, pressed together, and cured to form the disc. For single-sided discs, a label is applied onto the non-readable side (i.e., side opposite the polycarbonate layer or layers containing pits and lands). Audio CD and CD-ROMs are made in a similar manner, but comprise a single polycarbonate layer laminated to a metallic film and relatively thin acrylic layer.

Compared to competing technologies such as magnetic storage media, optical discs are mechanically robust and inexpensive. Despite these advantages, however, optical discs can be improved. Although the polycarbonate plastic layer has excellent optical properties and good dimensional stability, the surface may be scratched during handling, which may compromise data stored on the disc. For example, after removing compact discs from their protective cases, users may place them on comparatively hard flat surfaces, such as a tabletop or desktop, with the polycarbonate or readable side face down (label-side face up). Since optical discs are quite thin, users find it difficult to pickup CDs without dragging them across the tabletop. In doing so, hard contaminants on the surface of the tabletop and any defects in the tabletop surface may scratch, gouge, or scuff the polycarbonate plastic layer. Similarly, users often stack CDs to conserve space. Any dirt particles trapped between individual CDs may also damage the surfaces of individual CDs during handling of the stack. Although the optical properties of polycarbonate and on-disc error correction help reduce the affects of surface scratches, repeated damage to CD surfaces over time may render some data unreadable.

The present invention overcomes the one or more the problems described above.

SUMMARY OF THE INVENTION

The present invention provides an optical disc having projections or embossments on one or both major surfaces of the disc. When the optical disc is placed on a generally flat surface such as a tabletop or a desktop, the projections act as pedestals that elevate the bulk of the optical disc above the flat surface. The resulting gap or clearance enables users to grasp and to pickup the optical discs without dragging the discs across the flat surface. Moreover, even if the optical disc is dragged across the tabletop or desktop, the clearance helps prevent damage to the optical disc caused by contaminants on the flat surface or by defects in the flat surface. The projections are sized to provide adequate clearance between the disc and the flat surface, while minimizing interference between the projections and components of optical disc readers and drives. The projections can range in height up to about one mm, i.e., about the thickness of a standard compact disc (CD) or digital videodisc (DVD), but typically the height of the projections is about half the thickness of a standard CD or DVD. In addition, the projections are ordinarily provided at predefined non-data portions of the optical disc—e.g., in the program lead-out region or between the clamping region and the program lead-in region—so that the projections will not disturb data storage or retrieval. Generally, however, the projections can be placed in a disc's data storage (program) area if it lacks encoded digital data. The optical disc may also include one or more depressions that are sized and configured to receive projections from another disc, which facilitates stacking of the optical discs.

The present invention also includes a system and method for protecting an optical disc that is used to store and retrieve digital data. The system includes one or more projections or embossments that can be applied to a surface of the optical disc. The projections are sized and configured to prevent interference with digital data retrieval and to provide clearance between the surface of the optical disc and a substantially flat surface when the surface of the optical disc is placed on the substantially flat surface. Similarly, the method includes providing one or more projections on at least one surface of the optical disc. Like the inventive system, the projections are sized and configured to prevent interference with digital data retrieval and to provide clearance between the optical disc and the substantially flat surface. The projections can be formed during fabrication of the optical disc (i.e., by injection molding) or can be applied to the surface of the optical disc by bonding techniques.

The present invention further provides one or more projections or projection types having a flat surface at a point of contact to an external surface and/or projections or projection types that may be configured to enhance aerodynamics. The projection types also may be configured, for example, to resemble bisected ellipses, spheres, and/or crescents having convex and/or concave edges with a portion removed at a point of contact to the external surface.

These and other objects, features, and advantages of the invention will be apparent through the detailed description of various embodiments and the drawings attached hereto. It is also to be understood that both the foregoing general description and the following detailed description are exemplary and not restrictive of the scope of the invention.

BRIEF DESCRIPTION OF THE DRAWINGS

Numerous other objects, features, and advantages of the invention should now become apparent upon a reading of the following detailed description when taken in conjunction with the accompanying drawings, a brief description of which is included below.

DETAILED DESCRIPTION OF THE PREFERRED EMBODIMENTS

Figure 1:
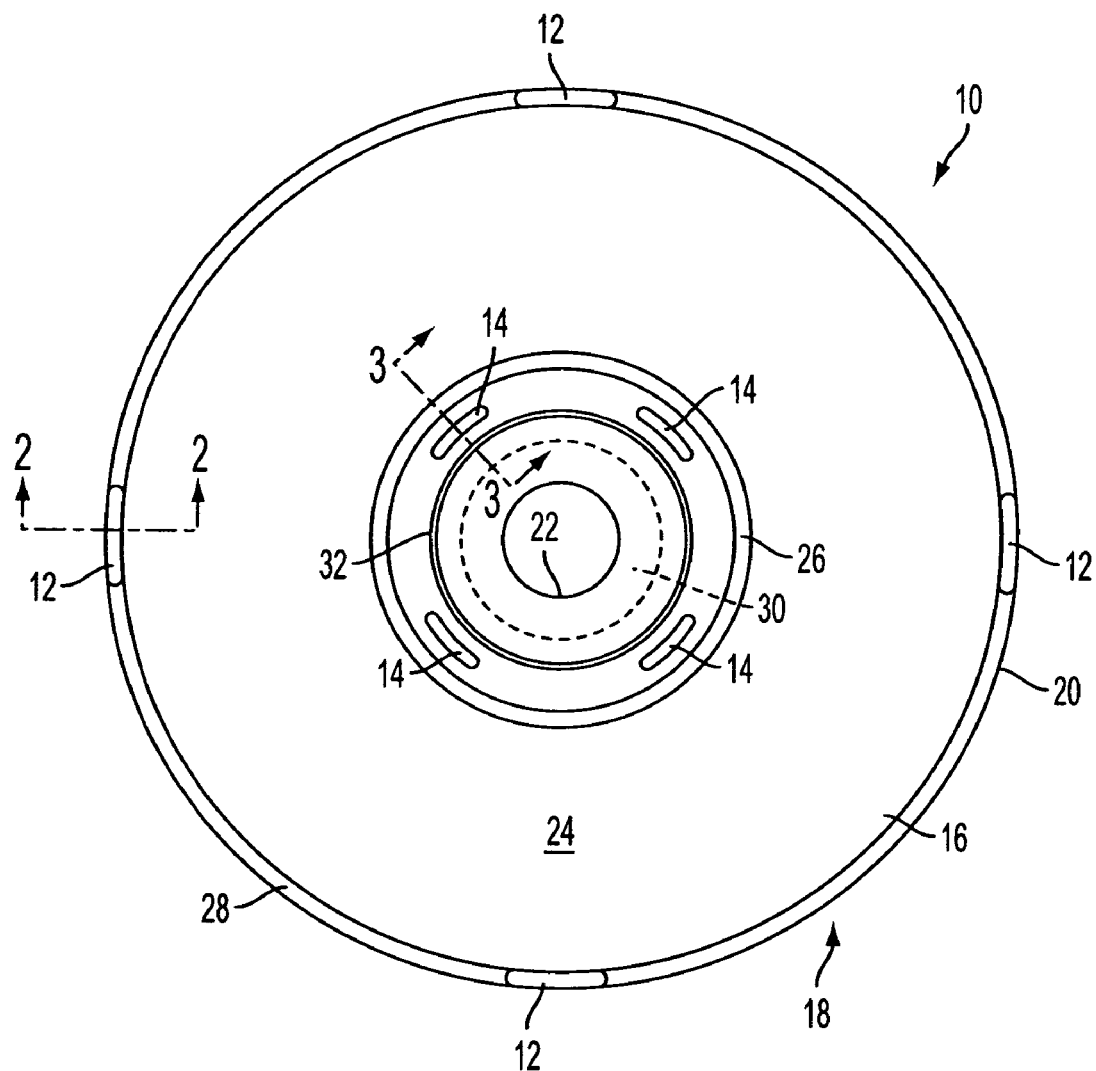
FIG. 1 illustrates a bottom view of an optical disc having projections or embossments for protecting the optical disc surface.

FIG. 1 shows a bottom view of an optical disc 10 having first type projections 12 and second type projections 14 or embossments that protect the optical disc 10 from damage, for example, scratches, gouges, scuff marks, etc. For clarity, various embodiments of the optical disc 10 are described in terms of a standard audio compact disc (CD), and to a lesser extent, in terms of a digital videodisc (DVD). However, the disclosed invention is not limited to audio CDs and to DVDs, but applies generally to any optical disc that is used to store and retrieve digital data, including read only memory compact discs (CD-ROMs, DVD-ROMs, etc.), recordable compact discs (CD-R), rewritable compact discs (CD-RW), and the like.

The optical disc 10 shown in FIG. 1 is comprised of a pair of substantially parallel first 16 and second 18 surfaces. As shown in FIG. 1, the first 16 and second 18 surfaces have substantially circular and concentric outer 20 and inner 22 peripheries, although generally the optical disc's outer periphery may assume any shape. As noted above, digitized data may be encoded on the optical disc 10 as a sequence of microscopic pits (or dark spots) interrupted by smooth areas (lands) that define a continuous track (or concentric tracks) spiraling outward from the center of the disc 10. In the embodiment shown in FIG. 1, the encoded data lies within a data storage (program) area 24 that can be accessed by shining laser light through the substantially transparent first (bottom) surface 16. The data storage area 24 may be defined between a lead-in area 26 and a lead-out area 28, which are located adjacent to the inner 22 and outer 20 peripheries of the first surface 16, respectively. For a standard audio CD, the lead-in and lead outer areas may begin, respectively, at radii 23 mm and 58 mm, and end at radii 25 mm and 60 mm, for example. The lead-in area 26 typically contains digital silence (no data) in the main channel plus the optical disc's table of contents in the subcode Q-channel, whereas the lead-out area 28 usually contains no data.

As can be seen in FIG. 1, first type projections 12 and second type projections 14 may be located in predefined non-data regions of the optical disc 10. Thus, the first type projections 12 may be located on the optical disc's first surface 16 within the lead-out area 28. Similarly, the second type projections 14 may be located on the optical disc's first surface 16 between a clamping region 30 and the lead-in area 26. The clamping region 30 generally refers to a portion of the optical disc 10 that contacts a disc drive mechanism during playback or recording (see FIG. 5). A ridge 32 encircles the inner periphery 22 of the optical disc 10 and is typically located adjacent to the outer radius of the clamping region 30.

Each type of projections 12, 14 shown in FIG. 1 may be comprised of four discrete and elongated projections 12, 14, for example, although the number, size, and shape of individual projections can vary among optical discs. The types of projections 12, 14 illustrated in FIG. 1 may be evenly distributed within the lead-out area 28 and adjacent to the lead-in area 26, respectively, which helps stabilize the (rotating) optical disc 10 during playback and recording. Furthermore, each type of projections 12, 14 may be offset, such that any individual second projection 14 may lie about midway between an angle formed by the center of the optical disc 10 and two adjacent first projections 12. This latter arrangement should provide a more uniform clearance between the optical disc 10 and any flat surface the disc 10 is placed on. Thus, for a given set of projections (e.g. first set of projections 12), the projections may be arranged so that the angular displacement between any two adjacent projections is about $2\pi/n$, where n is the number of projections belonging to that set. In addition, it is generally desirable to offset the first type projections 12 and second type projections 14 so that the angular displacement between adjacent first 12 and second 14 projections is $\pi/n$ radians. In this way the projections' center of mass lies near the optical disc's rotation center (i.e., within its inner periphery).

In a further embodiment, the projections are placed within the lead-out area 28 of the optical disk 10 and may be arranged so that they are radially aligned with projections placed in or adjacent to the lead-in area 26. Furthermore, the projections placed within the lead-out area 28 of the optical disk 10 may be arranged so that they are non-radially aligned with projections placed in or adjacent to the lead-in area 26. Additionally, the projections placed within the lead-out area 28 of the optical disk 10 may be arranged so that there is no specified alignment with projections placed in or adjacent to the lead-in area 26.

In other embodiments, the optical disc 10 may include the first type of projections 12, but not the second type of projections 14, or may include the second type of projections 14, but not the first type of projections 12. Any combination of first type projections 12 and second type projections 14, or other projection types, may be used in any of the embodiments described herein. In other embodiments, the optical disc 10 may have discrete projections that are spaced apart and placed adjacent to the outer edge, where the projections include at least first type projections having a first predetermined configuration including, for example, a height, a shape, a length, a width, etc. Second type projections also may be provided having configurations that are the same or different from the configurations provided for the first type projections.

Figure 8A:
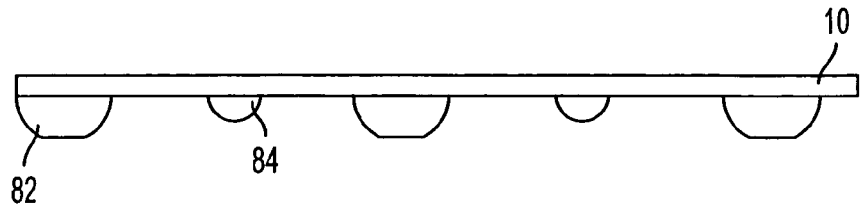
FIGS. 8a-8e illustrate various embodiments of the optical disk having several projection arrangements.
Figure 8B:
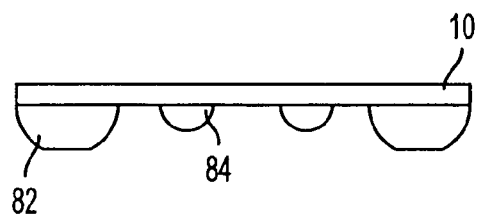
Figure 8C:
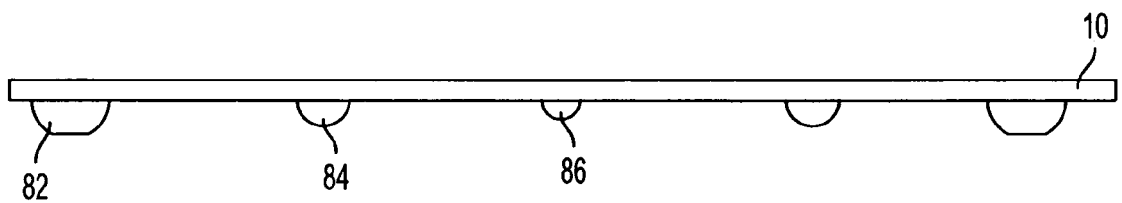
Figure 8D:
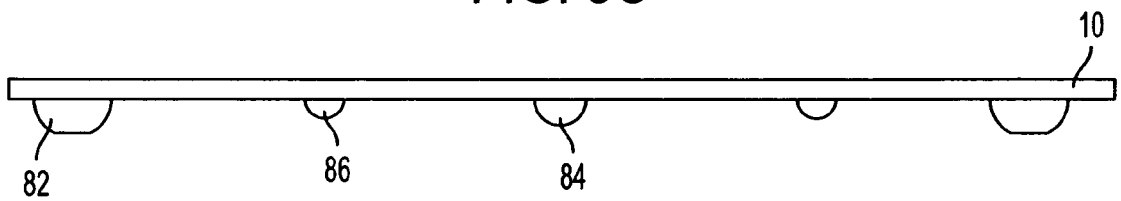
Figure 8E:
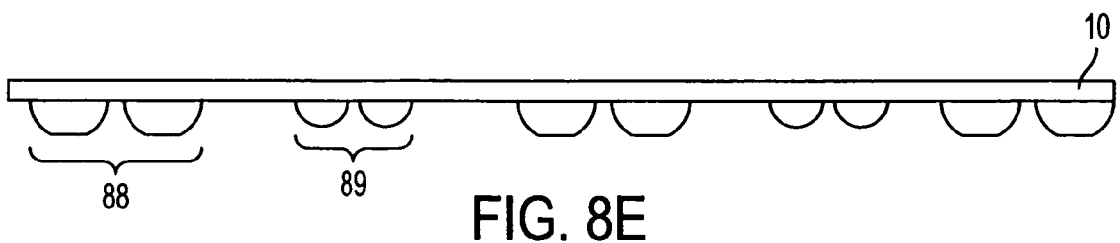

FIG. 8a illustrates the optical disk 10 having a predetermined pattern of first type projection 82 and second type projection 84 that are alternately spaced. FIG. 8b illustrates the optical disk 10 having a predetermined pattern of two second type projections 84 between two adjacent first type projections 82. FIG. 8c illustrates the optical disk 10 having a predetermined pattern of first type projection 82, second type projection 84, and third type projection 86 configured, for example, as first, second, third, second, first type projections. FIG. 8d illustrates the optical disk 10 having a predetermined pattern of first type projection 82, second type projection 84, and third type projection 86 configured, for example, as first, third, second, third, first type projections. FIG. 8e illustrates yet another embodiment of the optical disk 10 having sets of adjacent projections (88, 89) with different configurations (e.g., heights or other characteristics). In the displayed embodiment, there are a set of two first type projections, two second type projections, etc., such as two large, two small, etc. Additional embodiments illustrating various projection patterns and configurations are within the scope of this disclosure.

In additional embodiments, for example, the invention contemplates the optical disc with projection patterns formed from three or more types of projections having different configurations. Furthermore, the invention contemplates that the number of projections adjacent to the outer edge of the disk, including first type projections and second type projections, for example, are greater than the number of projections on the inner periphery, and that the inner periphery may or may not include more than one type of projections.

Figure 10A:
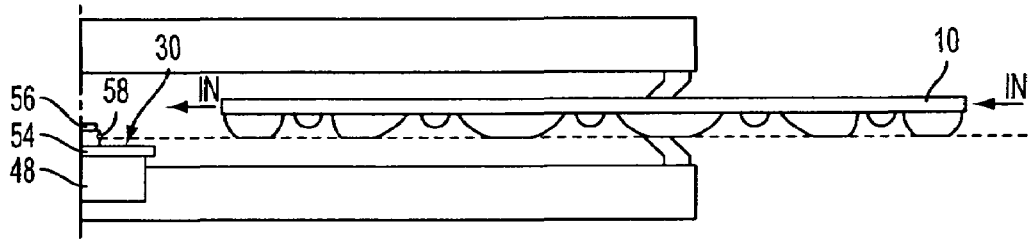
FIGS. 10a and 10b illustrate an optical disk being loaded into a slot type disc reader.
Figure 10B:
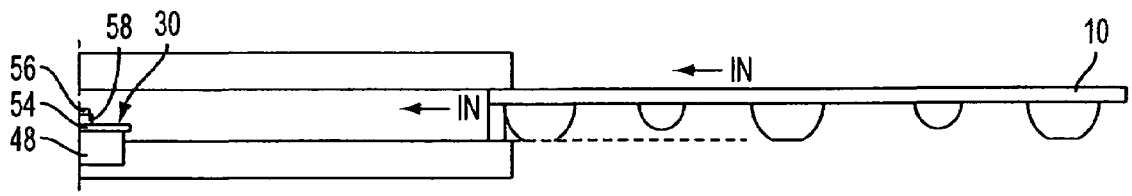

In the embodiments illustrated in FIGS. 8a-8e, a height of the first type projections may be chosen to maximize protection of the disc surface, while the spacing of the first type projections may be chosen to minimize interference during loading of the optical disk into a slot load CD player or the like, as illustrated in FIGS. 10a and 10b. A height of the second type projections may be chosen in relation to the height and spacing of the first type projections. For example, the height of projections on the inner periphery and the height of projections on the outer periphery may be essentially equal to reduce warping when the optical disk is exposed to heat, wherein the equivalent height prevents pressure between the concentric projections from causing the disk surface to contact a support surface that would cause scratching of the disk surface.

Figure 9A:
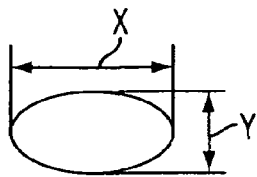
FIGS. 9a-9c illustrate a top, side, and front view of a projection.
Figure 9B:
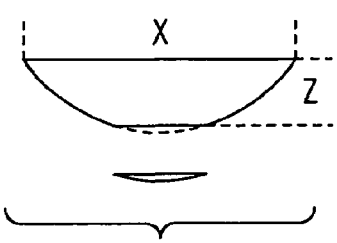
Figure 9C:
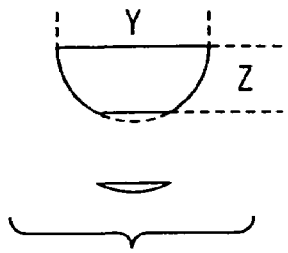

In other embodiments illustrated in FIGS. 9a-9c, one or more projections or projection types may be provided with a flat surface at a point of contact to an external surface and/or projections or projection types may be configured to enhance aerodynamics. In further embodiments, the projection types may be configured, for example, to resemble bisected ellipses, spheres, and/or crescents having convex and/or concave edges with a portion removed at a point of contact to the external surface. In yet other embodiments, the projections or projection types may be configured, for example, to have approximately the bottom one-fifth of the projection shape removed to create a substantially flat surface that aids in weight displacement, preserves a streamlined shape, and provides other benefits (e.g., provides a flat surface when stacking disks).

Figure 14:
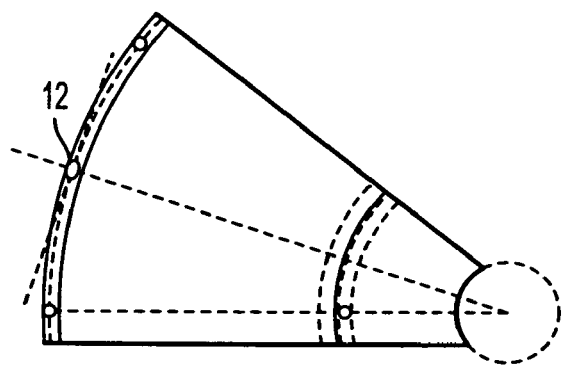
FIG. 14 illustrates a portion of the optical disc with projections located on an inner and outer periphery.

The optical disc may employ projections having any desirable shape, including, for example, spherical sections, spheroidal sections, tetrahedrons, ellipses, crescents, quadrahedrons, pentahedrons, hexahedrons, etc. In a further embodiment illustrated for example in FIG. 14, the optical disc may include elongated projections 12 on the outer periphery where a direction of elongation (e.g., a major axis) may be oriented approximately perpendicular to the radius of the optical disk 10. Alternatively, the direction of elongation (e.g., a major axis) may be oriented tangential to the outer edge of the optical disk 10. This orientation provides, for example, increased aerodynamic properties and/or enables the size of the projections to be maximized within the lead out zone without interfering with data acquisition. The lead out zone typically includes critical information required for proper functioning of the optical drive and therefore the projections may not be permitted to overlap portions of the lead out zone. For example, in a typical situation, information is positioned in the lead out zone on four tenths of a millimeter of track width to accommodate the closeout storage needs. In less frequent situations, information is positioned in the lead out zone on up to six tenths of a millimeter of track to accommodate the closeout storage needs.

Figure 15:
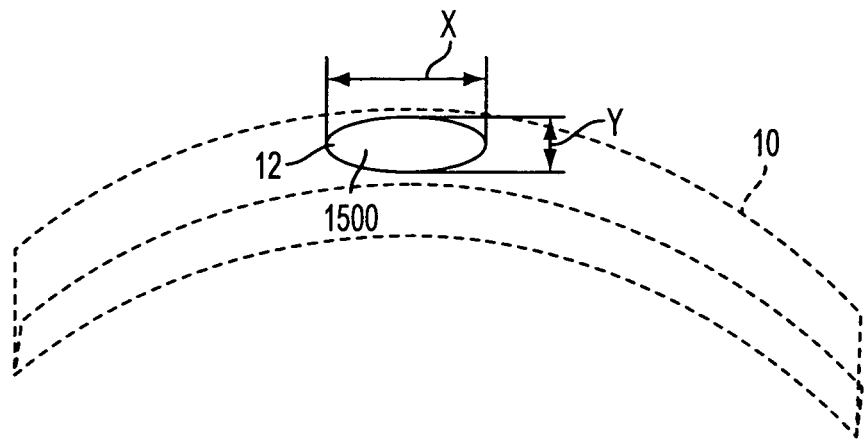
FIG. 15 illustrates a close up of an edge of the optical disk having a projection in a preferred orientation to maximize the surface area of the flat portion on the projection.

In the case of maximizing the size of projections within the lead out zone, the larger projection size enables various advantages. For example, in the case of one embodiment, this enables the creation of a larger flat surface on the projection, which further enables weight distribution per unit area to be increased and other advantages. FIG. 15 provides an exemplary embodiment illustrating an optical disk 10 having projections 12 oriented with a direction of elongation (e.g., a major axis) oriented tangential to the outer edge of the optical disk 10. The larger the projection size, the larger the flat surface may be on the projection to minimize wear and tear on the projection. This is commonly referred to as the sandpaper effect, wherein the projections may be gradually worn away so that they become shorter in height. The shortened height in turn lessens the protection to the disk surface. In order to mitigate this effect, a larger projection may be initially provided, but the projection size should not be too large to interfere with loading of the optical disc in a disc reader, for example, slot load drives.

In a further embodiment, the optical disc may additionally or alternatively include one or more continuous projections that circumscribe the inner periphery 22 of the optical disc, similar to the ridge 32 located adjacent to the clamping region 30. The continuous projections may be substantially larger than the ridge 32. In other embodiments, the optical disk may include projections and also have a clear protective coating 21 placed over all or part of the discs first and/or second surfaces.

Although it is usually desirable to locate projections within the predefined non-data areas, the projections or embossments may also be located in areas that are usually reserved for data storage. For example, projections may be located within the data storage area 24 adjacent to the lead-out area 28, as long as the particular optical disc contains no data in that area. This will often be the case when the amount of stored data is less than the optical disc's data storage capacity since CDs and single-layer DVDs encode data in a track that spirals outward from the lead-in 26 area.

Figure 12:
FIG. 12 illustrates a side view of an optical disc having a tapered edge.
Figure 13:
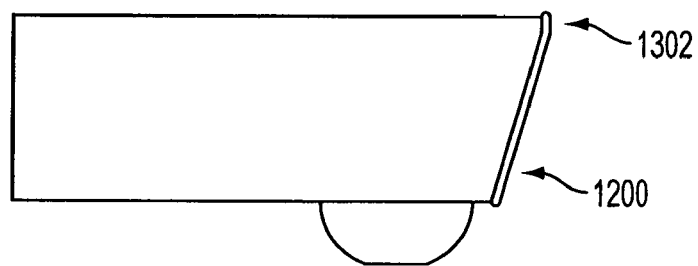
FIG. 13 illustrates a close-up view of an optical disc having a tapered edge.

To facilitate with lifting the optical disc 10 off of a surface, the outer edge of optical disc 10 may be modified to include a tapered edge 1200 with the diameter at the bottom of the disc being less than the diameter at the top of the disk, as illustrated in FIG. 12, or vice versa. This tapered edge, combined with the large projections, may further facilitate the ease with which the disc may be lifted off a surface. A portion of the tapered edge may include a reinforcing concentric lip to strengthen the edge of the disc. In an additional embodiment illustrated in FIG. 13, an upper portion 1302 of the tapered edge 1200 may include a concentric lip configured to smoothen the upper portion 1302 of the tapered edge 1200 to prevent a handler from being injured from an otherwise sharp edge.

In general, the projections may be applied or formed on both the first 16 and second 18 surfaces of the optical disc 10. Since data is read through its first (bottom) surface 16, the optical disc 10 illustrated in FIG. 1 may have no projections located on its second (top) surface 18. However, with double-sided DVDs or the like, data may be read through substantially transparent bottom and top surfaces. Moreover, even if data is only accessed through the bottom surface 16, minor scratches on the top (label) surface 18 of audio CDs, CD-ROMs, CD-Rs, and CD-RWs, or the like, may compromise data integrity since the acrylic layer 19 that protects the metallized reflective layer is much thinner than the polycarbonate layer.

Figure 2:
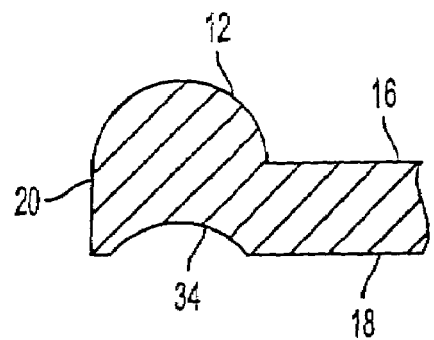
FIG. 2 illustrates an enlarged partial cross section of the optical disc through section line 2 of FIG. 1.
Figure 3:
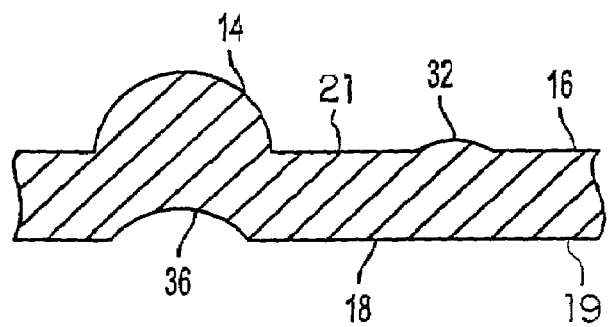
FIG. 3 illustrates an enlarged partial cross section of the optical disc through section line 3 of FIG. 1.

The optical disc 10 illustrated in FIG. 1 has first 34 and second 36 depressions (not shown) on the second surface 18, which are sized to accommodate the projections 12, 14. FIG. 2 and FIG. 3 illustrate enlarged partial cross sections of the optical disc 10 through section line 2 and section line 3, respectively, wherein the depressions 34, 36 are located adjacent to the projections 12, 14 and facilitate stacking of optical discs. The height of projections 12, 14 are greater than the depth of the depressions 34, 36 so that a gap or clearance may be formed between adjacent optical discs when stacked. In an alternative embodiment, it may be desirable to size the depressions 34, 36 so that the clearance between adjacent optical discs is a small fraction of the optical disc 10 thickness. Furthermore, the height of ridge 32 illustrated in FIG. 3 may be made substantially less than the height of the projections 14.

Figure 4:
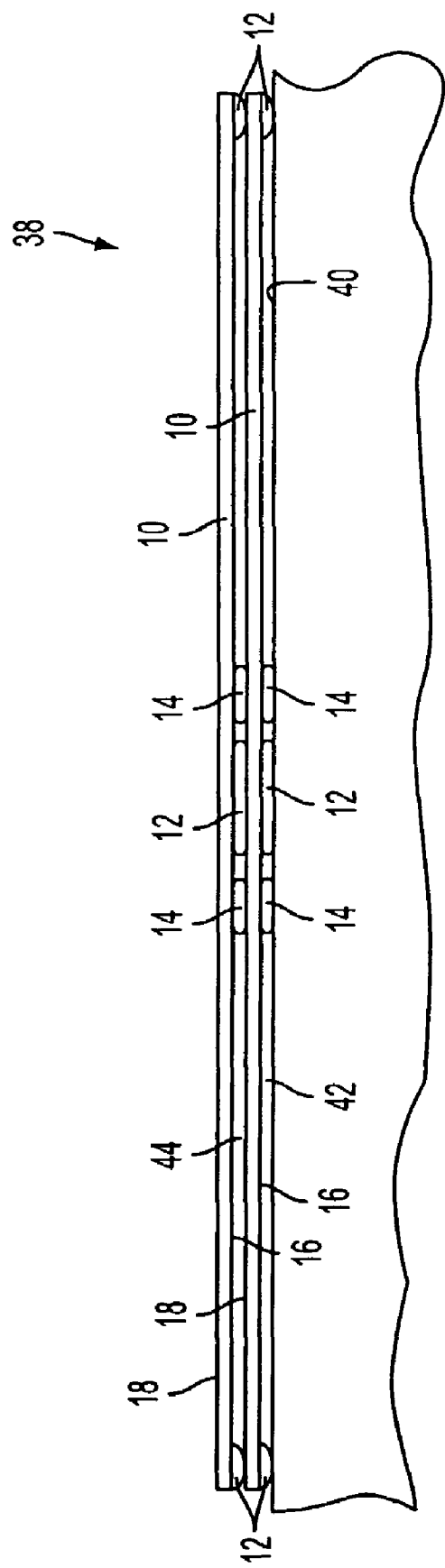
FIG. 4 illustrates a side view of a stack of two optical discs resting on a flat surface such as a tabletop or desktop.

FIG. 4 illustrates a side view of a stack 38 of two optical discs 10 resting on a flat surface 40 such as a tabletop or desktop, for example. Although not illustrated in FIG. 4, the optical discs 10 may have depressions 34, 36 such as those shown in FIG. 2 and FIG. 3. The projections 12, 14 and depressions 34, 36 stabilize the stack 38 of optical discs 10 and minimize the relative movement of adjacent optical discs 10 that may damage their surfaces 16, 18. The height of each of the projections 12, 14 illustrated in FIG. 1 does not vary significantly among projections 12, 14 so that a gap or clearance 42 between the first surface 16 of the optical disc 10 and the flat surface 40 of the tabletop is substantially uniform. Since the depressions 34, 36 are shallower than the height of the projections 12, 14, a gap or clearance 44 between respective first 16 and second 18 surfaces of adjacent optical discs is less than the clearance 42 between the optical disc 10 and the flat surface 40. Nonetheless, the clearance 44 between adjacent optical discs 10 is sufficient to minimize damage to their surfaces 16, 18.

Regardless of the location of the indentation grooves along the radial distance from the center of the disc, corresponding projections will be centered at the same radial distance from the center of the disc. The indentation groove depth and shape will be essentially a mirror image of the portion of the projections that will fill the cavity. In one embodiment, for example, the combined lengths of the indentation grooves at a given radius will be approximately equal to one-half the circumference (180 degrees). By dividing one-half of the circumference by the number of primary projections in the set "N", it is possible to determine the length (180 degrees/"N"="L") of the individual groove segments.

In an exemplary embodiment utilizing ten (10) primary first type projections 12, the degree of separation of the indentations is calculated by taking one-half the circumference as represented as "180 degrees" and dividing by "10=N" (180/

N="L"). As a result, the ideal length of the indentation grooves is determined to be "L" (18 degrees). The distance "D" between two adjacent indentation grooves ("D"=Distance between grooves) in a radial pattern, will be equal to the Length "L" of the indentation groove ("D=L"). Therefore, in this example, there will be 10 spaces each 18 degrees in length, totaling 180 degrees.

Furthermore, an ideal symmetry of indentations on a first disc may be calculated to accommodate the first type projections from a second disc stacked on top of the first disk, while enabling the second type projections on the second disk to contact the surface of the first disc directly below. The second type projections assist in supporting the weight of discs stacked above the disc. Additionally, a third type projection located at a radius less than the start of the data zone may be provided in alignment with corresponding indentation grooves on an adjacent disc.

In an exemplary embodiment having a total of 10 first type projections, wherein "N" is the number of first type projections in the set, "D" is the distance between indentation grooves, and "L" is the length of the indentation grooves, length ("L") of the indentation grooves may be determined using (360/2/"N"="L"). In particular, (360/2=180) and (180/10=18), so (18=L). Next, the distance between two adjacent indentation grooves may be calculated using ("D"="L"). In this example, ("L"=18)=("D"=18).

Figure 19:
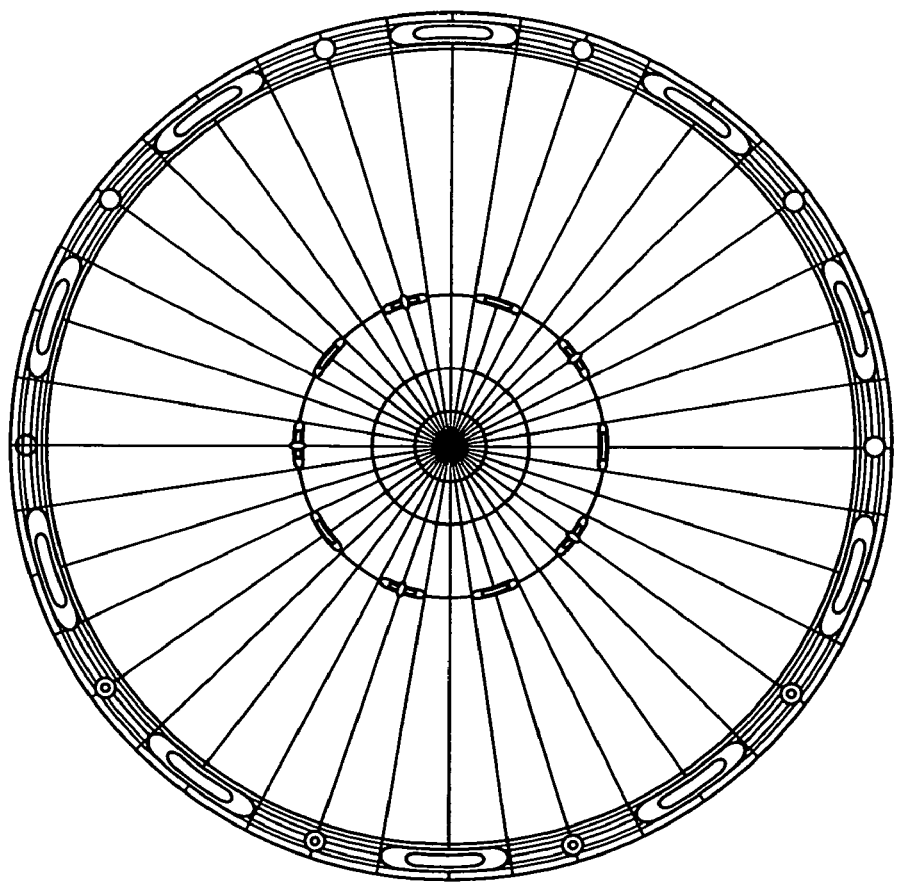
FIG. 19 illustrates an embodiment for placing indentation grooves on an inside periphery and outside periphery of the optical disk.

As illustrated in FIG. 19, a location of the center points of the indentation grooves may be determined based on whether the projections are provided on only the outer periphery of the optical disc or whether the projections are provided on both the outer and inner peripheries of the optical disc. If a second series of grooves are configured to receive projections on the inner periphery, the groove segments will be centered directly below the projections they are configured to accommodate. As a result, if the projections on the inner periphery are aligned on a same radial axis as the projections on the outer periphery, then corresponding indentation grooves may also be centered on a same radial axis. If the projections on the inner periphery are configured on a radial axis as the projections on the outer periphery, then the corresponding indentation grooves may also be centered on the same radial axis. If the projections on the inner periphery are aligned on a radial axis that bisects the space between the grooves located on the outer periphery, the corresponding indentation grooves must also be centered on the same radial axis.

In another embodiment, several discrete indentation grooves may be preferred over a single continuous indentation groove. For example, in particular instances, the structural integrity of the optical disc may be preserved more readily using discrete indentation grooves. For example, the indentation grooves may be designed having a depth of at least the difference between the heights of the first type projections and second type projections, which vary, for example, from 0.1 mm to 0.4 mm, which is typically one twelfth to one third of the thickness of the 1.2 mm thick optical disc. In this example, the continuous groove at a depth equal to one-quarter of the thickness of the optical disc would substantially weaken the structural integrity. Furthermore, a continuous indentation groove may weaken the disc substrate and allow undesirable flexing, for example.

In an embodiment having two discs stacked together, a resulting gap between the discs may include at least two heights. A passive safety-gap may be formed equal in height to the first type projections less the depth of the indentation groove. However, this statement is true only if the height of the second type projections are equal to or less than "X", which is the height of the first type projections less the depth of the indentation groove.

Figure 16A:
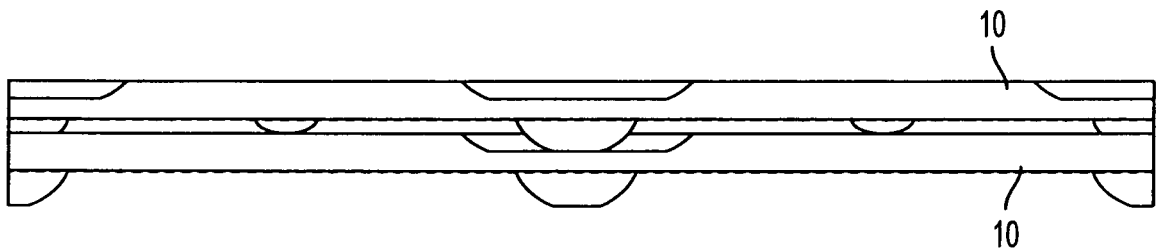
FIG. 16a illustrate a side view of stacked discs wherein the projections on the upper disc are in indentation grooves of the lower disc.
Figure 16B:
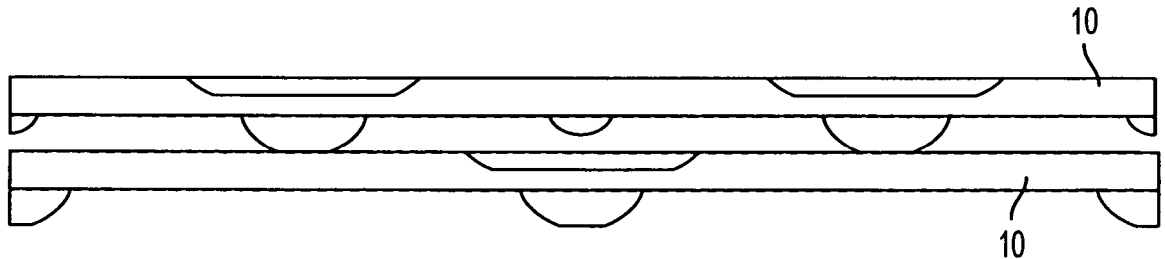
FIG. 16b illustrate a side view of stacked discs wherein the projections on the upper disc are not in indentation grooves of the lower disk.

In an embodiment having a foreign particle trapped between two stacked discs, wherein the foreign particle has a greater height than the passive safety-gap, the discrete indentation grooves will lessen the amount of damage sustained by either disc, compared to a disc manufactured with a continuous indentation groove. This is due to a limited range of angular motion in the optical disk having the discrete indentation grooves. For example, if the discrete indentation grooves are spaced 18 degrees apart, then only 18 degrees of angular surface would be exposed to the potential hazard before the resulting gap would increase to the full height of the largest type projections. The indentation grooves may be made substantially longer in length than the corresponding projection to ensure that the user does not need to rotate the disc more than "D" in order to align the projections and the indentation grooves. FIGS. 16a and 16b illustrate the passive safety-gap and the active safety-gap.

Figure 17:
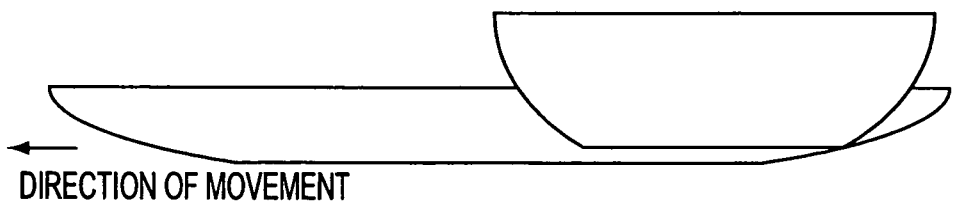
FIG. 17 illustrates a close-up view of a projection inside an indentation groove.

In a further embodiment illustrated in FIG. 17, the discrete indentation grooves may be provided, for example, with ramped ends or the like. When two discs are stacked together and the first type projections are properly seated in the corresponding discrete groove indentations, the first type projections will rise up out of the ramped indentation groove upon the discs being rotated in opposite directions. This enables a disk handler to select any optical disc in a stack and rotate the desired optical disc until the passive safety-gap enlarges to an active safety-gap. This enables the user to more easily create a desired breakpoint of the stack. Furthermore, the enlarged active safety-gap allows the user to more easily lift the tapered concentric lip of the upper disc.

Figure 18:
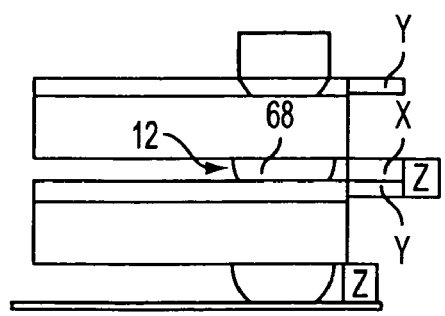
FIG. 18 illustrates another close-up view of a projection inside an indentation groove.

In another exemplary embodiment illustrated in FIG. 18, the depth of grooves "Y" are ideally equal to the difference in height between the primary projections set "Z" and the secondary projections set "X".

In the embodiment shown in FIG. 4, the heights of individual projections 12, 14 are comparable to the thickness of the optical disc 10 (i.e., about one mm). Generally, however, the projections are sized to provide adequate clearance between the optical disc 10 and the flat surface 40, while minimizing interference between the projections 12, 14 and components of optical disc readers and drives. For compact discs and videodiscs, for example, this corresponds to projection heights less than the thickness of the optical disc, and more typically, to projection heights about half the thickness of standard CDs or DVDs, for example.

Figure 5:
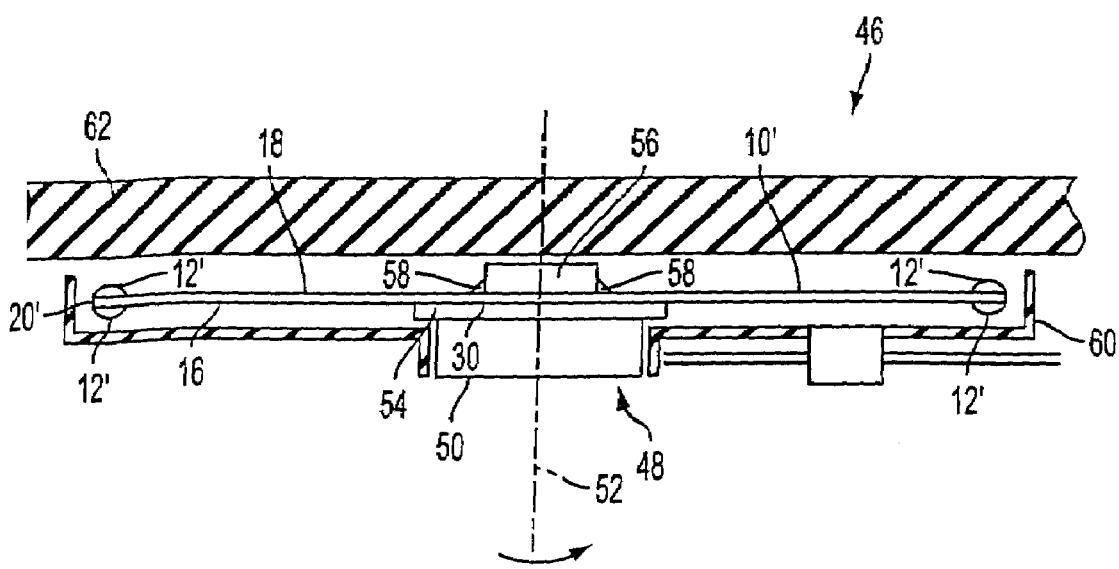
FIG. 5 illustrates placement of an optical disc having clearance projections or embossments within a section of an optical disc reader or player.

FIG. 5 illustrates the placement of an optical disc 10' having clearance projections or embossments within a portion of an optical disc reader 46 (player). The optical disc 10' shown in FIG. 5 includes sets of projections 12' located on both first 16 and second 18 surfaces along the outer periphery 20 of the disc 10'. The dual sided optical disc 10' includes, for example, a predetermined pattern of first type projections and second type projections on the first side of the optical disc 10'. The first type projections and second type projections may be alternately spaced along the optical disc 10' to provide radial symmetry and enable even mass distribution. This reduces the probability of causing the optical disc to become lopsided during rotation, which may result in accelerated wear and tear of the optical read/write drives. The configuration may include two second type projections between two first type projections, where a height of the first type projections is chosen to maximize protection of disc surface and the spacing of the first type projections is chosen to minimize interference during loading into a CD player, for example. The height of the second type projections is chosen in relation to height and spacing of the first type projections. In another embodiment, the first type projections may have a flat surface at the contact point with the external surface and the second type projections may or may not to have a flat surface at the contact point with the external surface, but may be configured to enhance aerodynamics. A predetermined pattern of projections on a second (i.e., opposite) side of the optical disc 10' may be configured such that the projections are approximately aligned with the second type projection, for example, on the first side of the optical disc 10'.

In other embodiments, predetermined patterns of projections on a second (i.e., opposite) side of the optical disc 10' may be configured such that the projections may or may not be aligned with the second type projections on the first side of the optical disc 10'. In additional embodiments, the height of the projections on the second side is chosen to maximize the protection of the disc surface 18 and to minimize interference during loading into CD player, for example. In yet other embodiments, the projections on the second side 18 of the optical disc 10' may or may not to have a flat surface at the contact point with an external surface and may be configured to enhance aerodynamics. In yet other embodiments, the projections on the first side of the optical disc 10' may align with projections on the second side of the optical disc 10'. In yet other embodiments, the projections on the first side of the optical disc may or may not align with the projections on the second side of the optical disc 10'. In each embodiment, the sum total of the optical disc thickness, which includes the height of first type projections on the first side of the optical disc 10' combined with the height of projections on the second side of the optical disc 10', must remain compatible with the opening of slot load drives.

The optical disc reader 46 includes an optical disc drive 48 comprised of a motor 50 for rotating the optical disc 10' about an axis 52 containing its center, a platen 54, and a cylindrical spindle 56 that is sized to accommodate the inner periphery (not shown) of the optical disc 10'. The disc drive 48 also includes spring-loaded tabs 58 that force the optical disc 10' against the platen 54 at the clamping region 30, thereby securing the optical disc 10' during playback. The optical disc reader 46 also includes a disc cradle 60 and housing 62, which are shown in cross-section for clarity. As illustrated in FIG. 5, the projections 12' are sized to prevent interference with the components of optical disc reader 46, including the optical disc drive 48, the disc cradle 60 and the optical reader housing 62.

Figure 11:
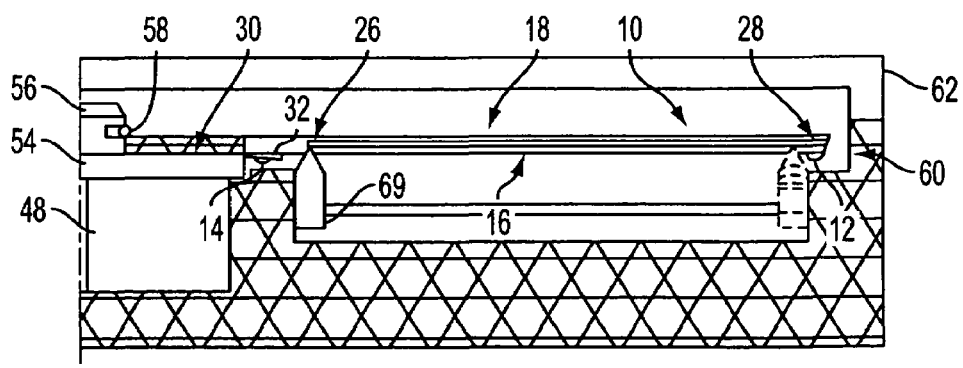
FIG. 11 illustrates an optical disc located within a disc playing device and further illustrates the relationship between the disc and the laser head.

FIG. 11 illustrates an alternative embodiment of the optical disc 10 situated in the optical disc reader with projections 12 and 14 placed near the outer edge and inner edge of the optical disc, wherein the projections are spaced from the inner most edge of the lead-out area to prevent collision with the laser head 69. In a further embodiment, the projections on the outer periphery and the projections on the inner periphery of the optical disc are located a minimum distance apart without interfering with data areas. This helps to minimize the chance that applying pressure to the disc at a point between an inner and outer projection will enable the disc to contact a surface on which the disc is located. In yet another embodiment, the projections on the outer periphery and the projections on the inner periphery of the optical disc are located a minimum distance apart without interfering with data areas, while minimizing a potential for interference with the laser head 69.

The projections 12, 12', 14 illustrated in the various figures may be provided on the optical disc in various ways. For example, the projections 12, 12', 14 may be formed during the fabrication of the optical disc 10, 10' using, for example, injection molding, thermoset/thermoplastic liquid polymer, decals, and/or self-adhesion stock, and the like. In addition, the projections 12, 12', 14 or embossments may be applied to an optical disc 10, 10' following its fabrication by displacing original material from the optical disc using, for example, hot stamping, and the like. Additionally, some additional material may be added to the optical disc after fabrication using, for example, adhesive bonding, thermal welding, friction bonding, and or interference bonding, and the like. In some embodiments, the projections 12, 12', 14 may be applied as thermosetting or thermoplastic liquid polymers that solidify through chemical cross-linking or cooling. In other embodiments, the projections 12, 12', 14 can be applied as decals or similar self-adhesive stock material. When applied after fabrication of the optical disc 10, 10', the projections 12, 12', 14 may be supplied in kits that can be applied by users of optical discs.

Figure 6:
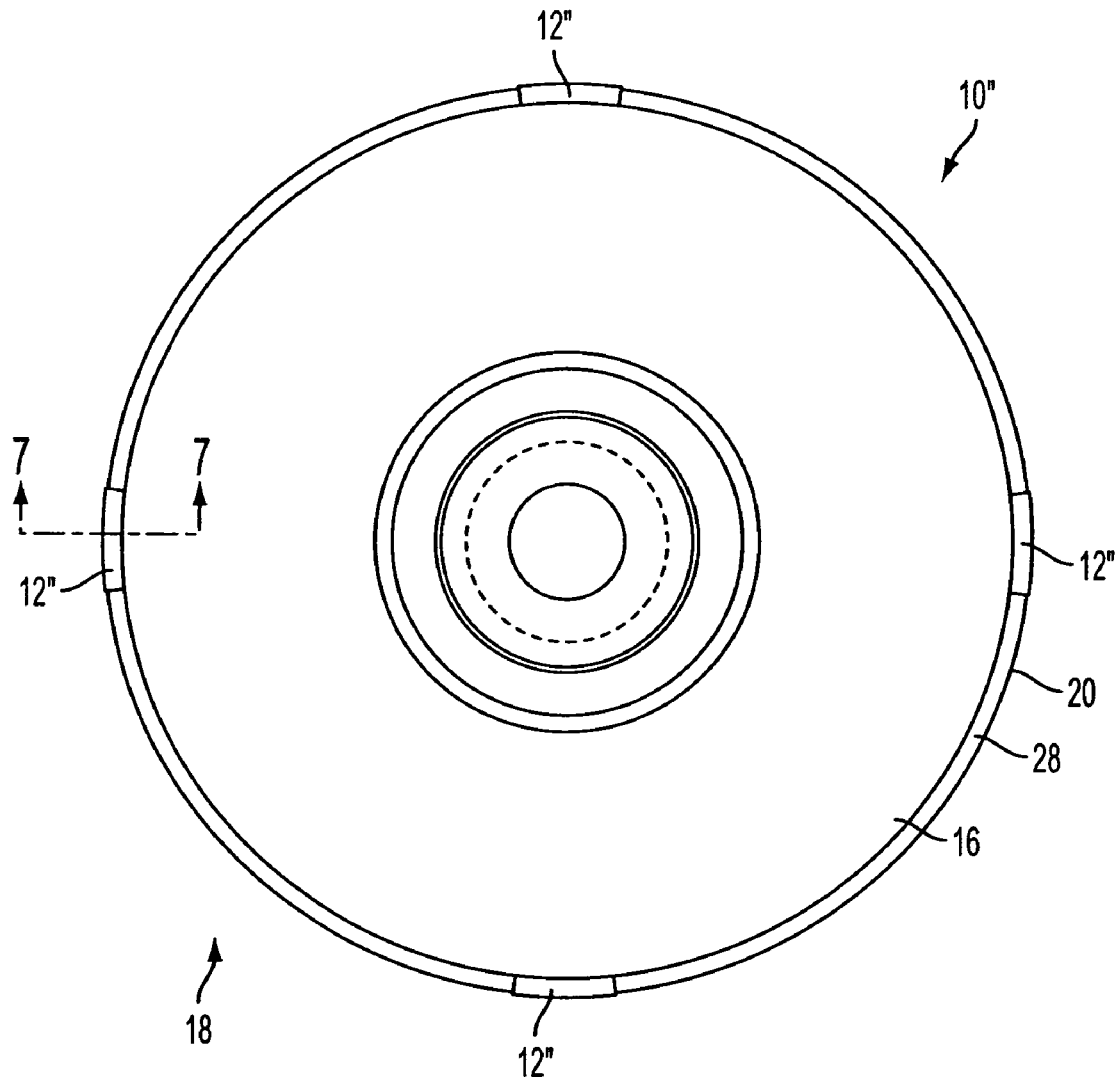
FIG. 6 illustrates a bottom view of an optical disc having projections or embossments that are applied following fabrication of the optical disc.
Figure 7:
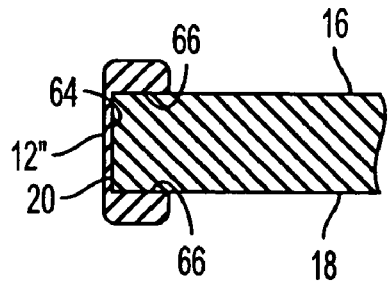
FIG. 7 illustrates an enlarged partial cross section of the optical disc through section line 7 of FIG. 6.

FIG. 6 is a bottom view of an optical disc 10" having projections 12" or embossments that are applied following fabrication of the optical disc 10". The projections 12" are held in place by an interference fit or friction bonding. Like the projections 12' shown in FIG. 1, the projections 12" are located within the lead-out area 28 of the optical disc 10", but extend slightly outward from disc's outer periphery 20. As shown in FIG. 7, which is an enlarged partial cross section of the optical disc 10" through section line 7, the projections 12" are located on both the first 16 and second 18 surfaces of optical disc 10". Each projection 12" is made of a resilient material and contains a slot 64, which is slightly smaller than the thickness of the optical disc 10". To install, individual projections 12" are clipped onto the outer periphery 20 of the optical disc 10" and are held in place by friction between the walls 66 of the slot 64 and the surfaces 16, 18 of the optical disc 10".

It should be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled. The disclosures of all patents, articles and references, including patent applications and publications, if any, are incorporated herein by reference in their entirety and for all purposes.

What is claimed is:

1. An optical disc, the disc comprising:
    a first surface having a number of discrete projections that are spaced apart on an outer edge of the first surface, wherein the projections include at least a first type of projection having a first configuration and at least a second type of projection having a second configuration different than the first configuration, the first surface also having a protective coating positioned over the first surface.

2. An optical disc according to claim 1, wherein the protective coating is clear.

3. An optical disc according to claim 1, further comprising:
    a second surface opposite to the first surface, and
    the protective coating is positioned over the second surface.

4. A method of protecting an optical disc, comprising:
    forming a first surface having a number of discrete first projections that are spaced apart at an outer edge of the first surface of the optical disc, the first projections sized and configured to prevent interference with digital data retrieval and to provide a clearance between the first surface of the optical disc and a substantially flat surface when the optical disc is placed on the substantially flat surface with the first surface of the optical disc facing the substantially flat surface; and placing a protective coating over the first surface.

5. A method according to claim 4, wherein the placing of the protective coating includes coating over the first surface.

6. A method according to claim 4, wherein the placing of the coating includes coating over the first surface and over a second surface.

7. A method according to claim 6, wherein the placing of the coating includes coating over substantially all of the first surface and substantially all of the second surface.

8. A method according to claim 4, wherein the forming of the first surface includes forming the projections by injection molding.

9. A method according to claim 4, wherein the forming of the first surface includes forming a number of discrete second projections that are spaced apart at an inner periphery of the first surface of the optical disc.

10. An optical disc that is used to store and retrieve digital data, the optical disc comprising:

first and second surfaces having inner and outer peripheries, at least the first surface of the optical disc capable of transmitting light, the first surface including one or more projections;

an area for storing digital data, the area located between the inner and outer peripheries of the first surface, the digital data being accessible by shining light through the first surface of the optical disc, the one or more projections sized and configured to avoid interference with retrieving the digital data stored on the optical disc and to provide a clearance between the first surface of the optical disc and a substantially flat surface when the optical disc is placed on the substantially flat surface with the first surface of the optical disc facing the substantially flat surface; and a protective coating positioned over the first surface.

11. An optical disc according to claim 10, wherein the protective coating is clear.

12. An optical disc according to claim 10, wherein the protective coating is positioned over the second surface.

* * * * *